(12) United States Patent
Yukinobu et al.

(10) Patent No.: US 7,053,126 B2
(45) Date of Patent: May 30, 2006

(54) PROCESS FOR PRODUCING NOBLE-METAL TYPE FINE-PARTICLE DISPERSION, COATING LIQUID FOR FORMING TRANSPARENT CONDUCTIVE LAYER, TRANSPARENT CONDUCTIVE LAYERED STRUCTURE AND DISPLAY DEVICE

(75) Inventors: Masaya Yukinobu, Chiba (JP); Yukiko Suekane, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 266 days.

(21) Appl. No.: 10/390,593

(22) Filed: Mar. 19, 2003

(65) Prior Publication Data

US 2003/0180511 A1  Sep. 25, 2003

(30) Foreign Application Priority Data

| Mar. 25, 2002 | (JP) | ............................... 2002/083031 |
| Jan. 21, 2003 | (JP) | ............................... 2003/011782 |
| Feb. 24, 2003 | (JP) | ............................... 2003/045596 |

(51) Int. Cl.
| *B01F 3/12* | (2006.01) |
| *B22F 1/00* | (2006.01) |
| *B22F 1/02* | (2006.01) |
| *C22C 5/00* | (2006.01) |
| *B32B 15/00* | (2006.01) |
| *B32B 5/16* | (2006.01) |

(52) U.S. Cl. .......................... 516/97; 75/255; 252/514; 428/403; 428/672

(58) Field of Classification Search .................... 516/97
See application file for complete search history.

(56) References Cited

U.S. PATENT DOCUMENTS

| 4,127,468 A | * | 11/1978 | Alfenaar et al. ............ 204/284 |
| 4,274,877 A | * | 6/1981 | Collier et al. ............... 75/252 |
| 6,261,479 B1 | * | 7/2001 | Yukinobu et al. ........... 252/514 |
| 6,447,909 B1 | * | 9/2002 | Kato et al. ................... 428/403 |
| 6,569,359 B1 | * | 5/2003 | Yukinobu et al. ........... 252/514 |

FOREIGN PATENT DOCUMENTS

| JP | 8-77832 | | 3/1996 |
| JP | 9-55175 | | 2/1997 |
| JP | 9-115438 | | 5/1997 |
| JP | 10-1777 | | 1/1998 |
| JP | 10-110123 | | 4/1998 |
| JP | 10-142401 | | 5/1998 |
| JP | 10-182191 | | 7/1998 |
| JP | 11-228872 | | 8/1999 |
| JP | 11-329071 | | 11/1999 |
| JP | 2000-124662 | | 4/2000 |
| JP | 2000-196287 | | 7/2000 |
| JP | 2000-268639 | | 9/2000 |
| JP | 2000268639 A | * | 9/2000 |
| JP | 2002-38053 | | 2/2002 |

* cited by examiner

*Primary Examiner*—Randy Gulakowski
*Assistant Examiner*—Timothy J. Kugel
(74) *Attorney, Agent, or Firm*—Westerman, Hattori, Daniels & Adrian, LLP

(57) ABSTRACT

A process for producing a noble-metal type fine-particle dispersions, having the steps of an agglomeration step of adding a hydrazine solution to a dispersion in which primary particles of noble-metal type fine particles have been made to stand monodisperse in a solvent, to destabilize the dispersibility of the noble-metal type fine particles in the dispersion and cause the plurality of primary particles in the noble-metal type fine particles to agglomerate in the form of chains to obtain a dispersion of chainlike agglomerates; and a stabilization step of adding a hydrogen peroxide solution to the dispersion of the chainlike agglomerates obtained, to decompose and remove the hydrazine to stabilize the dispersibility of the chainlike agglomerates in the dispersion.

2 Claims, No Drawings

US 7,053,126 B2

PROCESS FOR PRODUCING NOBLE-METAL TYPE FINE-PARTICLE DISPERSION, COATING LIQUID FOR FORMING TRANSPARENT CONDUCTIVE LAYER, TRANSPARENT CONDUCTIVE LAYERED STRUCTURE AND DISPLAY DEVICE

BACKGROUND OF THE INVENTION

1. Field of the Invention

This invention relates to a process for producing a noble-metal type fine-particle dispersion (liquid dispersion) in which noble-metal type fine particles have been dispersed in a solvent. More particularly, it relates to improvements in a process for producing a noble-metal type fine-particle dispersion in which the noble-metal type fine particles make up chainlike agglomerates, and also in a coating liquid for forming transparent conductive layers (hereinafter "transparent conductive layer forming coating liquid") which is obtained by this process, a transparent conductive layered structure which is obtained by using the transparent conductive layer forming coating liquid, and a display device incorporated with such a transparent conductive layered structure.

2. Description of the Related Art

At present, in cathode ray tubes (CRTs; also called Braun tubes) used as computer displays and so forth, it is required for their display screens to be easy to watch and not to cause visual fatigue. Moreover, any ill influence on human bodies by low-frequency electromagnetic waves generated from CRTs is recently worried about, and it is desired for such electromagnetic waves not to leak outside. Against the leakage of such electromagnetic waves, it can be prevented by forming a transparent conductive layer on the front-panel surface of a display. For example, for preventing the leakage of electromagnetic waves (i.e., electric-field shielding), it is required to form at least a transparent conductive layer with a low resistance of $10^6$ $\Omega$/square or less, preferably $5\times10^3$ $\Omega$/square or less, and more preferably $10^3$ $\Omega$/square or less.

Some proposals have been made on such low-resistance transparent conductive films. For example, proposed are methods such as a method in which a transparent conductive layer forming coating liquid in which fine conductive oxide particles of indium-tin oxide (ITO) or the like or fine metal particles have been dispersed in a solvent is coated on the front glass (front panel) of a CRT by spin coating or the like and the coating formed is dried, followed by baking at a temperature of about 200° C. to form the transparent conductive layer, a method in which a transparent conductive tin oxide film (nesa film) is formed on the front glass (front panel) by high-temperature chemical vapor deposition (CVD) of tin chloride, and a method in which a transparent conductive film is formed on the front glass (front panel) by sputtering of an indium-tin oxide, titanium nitride or the like.

The first-mentioned method making use of the transparent conductive layer forming coating liquid has been a very advantageous method because it is far simpler and can enjoy a lower production cost than the latter methods in which the transparent conductive film is formed by CVD or sputtering.

However, where, in the first-mentioned method making use of the transparent conductive layer forming coating liquid, the fine conductive oxide particles of indium-tin oxide (ITO) or the like are used as materials for the transparent conductive layer forming coating liquid, the transparent conductive layer formed has a surface resistance of as high as $10^4$ to $10^6$ $\Omega$/square. Hence, this has not been adequate for shielding the leaking electric fields.

Meanwhile, in the case of the transparent conductive layer forming coating liquid having fine metal particles used therein, a transparent conductive layer having a low resistance of from $10^2$ to $10^3$ $\Omega$/square can be formed although the film has a little lower transmittance than the coating liquid making use of ITO. Hence, this is considered to be a promising method in future.

As the fine metal particles used in the transparent conductive layer forming coating liquid, proposed are, as disclosed in Japanese Patent Applications Laid-open No. 8-77832 and No. 9-55175, particles of noble metals such as silver, gold, platinum, palladium, rhodium and ruthenium, which may hardly be oxidized in air. Incidentally, this publication also discloses that fine particles of a metal other than noble metals as exemplified by iron, nickel or cobalt may also be used. In practice, however, oxide films are necessarily formed on the surfaces of such fine metal particles in the atmosphere, and hence it is difficult to attain good conductivity as the transparent conductive layer.

In order to make display screens easy to watch, in CRTs, the surface of the front panel is subjected to, e.g., anti-glare treatment so that the screen can be restrained from reflecting light.

This anti-glare treatment can be made by a method in which a finely rough surface is provided to make diffused reflection on the surface greater. This method, however, can not be said to be preferable so much because its employment may bring about a low resolution, resulting in a low picture quality. Accordingly, it is preferable to make the anti-glare treatment by an interference method in which the refractive index and layer thickness of a transparent film is so controlled that the reflected light may rather interfere destructively with the incident light.

In order to attain the effect of low reflection by such an interference method, it is common to employ a film of double-layer structure formed of a high-refractive-index film and a low-refractive-index film each having an optical film thickness set at ¼ $\lambda$ and ¼ $\lambda$, or ½ $\lambda$ and ¼ $\lambda$, respectively ($\lambda$: wavelength). The film formed of fine particles of indium-tin oxide (ITO) as mentioned above is also used as a high-refractive-index film of this type.

In metals, among parameters constituting an optical constant $n-ik$ (n: refractive index; $i^2=-1$; k: extinction coefficient), the value of n is small but the value of k is great, and hence, also when the transparent conductive layer formed of fine metal particles is used, the effect of low reflection that is attributable to the interference of light can be attained by the double-layer structure as in the case of ITO (a high-refractive-index film).

In recent years, in addition to the above characteristics such as good conductivity and low reflectance, as CRT screens are made flatter, transparent conductive layered structures in which the transparent conductive layer of this type has been formed are further demanded to have characteristics by which their transmittance can be adjusted within a stated range lower than 100% (stated specifically from 40% to 95%, and commonly from 40% to 75%) to improve the contrast of images. To meet such a demand, it is also common to mix fine color-pigment particles or the like in the transparent conductive layer forming coating liquid.

Here, the reason why the transparent conductive layer having a low transmittance is formed in flat-screen CRTs is as follows: Face panels (front panels) of the flat-screen CRTs have a structure that the outer surface of the panel is flat and the inner surface thereof has a curvature. Hence, the face panel differs in thickness between the screen center and its periphery. This causes in-plane non-uniformity of brightness when conventional color glass (e.g., semi-tinted glass; transmittance: about 53%) is used in panel glass. Accordingly, a high-transmittance panel glass and a low-transmittance transparent conductive layer are combined so as to achieve both the in-plane uniformity of brightness and the improvement in contrast (the contrast is improved as the transmittance is lowered).

However, there has also been a problem that the addition of fine color-pigment particles or the like tends to make the transparent conductive layer have a little low conductivity.

Now, for a conductive layer having fine metal particles used therein, it is desirable that, since metals are originally not transparent to visible light rays, fine metal particles in a quantity as small as possible form conducting paths in the transparent conductive layer in a good efficiency in order to achieve both the high transmittance and the low resistance in the above transparent conductive layer. That is to say, as structure of a conductive layer formed by coating on a substrate a commonly available transparent conductive layer forming coating liquid composed chiefly of a solvent and fine metal particles, and drying the coating formed, it is necessary for the layer to have a structure in which microscopic openings (spaces) have been introduced into a layer of fine metal particles, i.e., a network structure.

Formation of such a network structure can provide a transparent conductive layer having low resistance and high transmittance. This is because the network part comprised of fine metal particles functions as conducting paths on the one hand and the part of openings formed in the network structure has the function to improve light ray transmittance, as so presumed.

As methods of forming the network structure of fine metal particles, they may include, in rough classification, the following methods.

(1) Methods of forming the network structure by causing fine metal particles to agglomerate with one another in the course that the transparent conductive layer forming coating liquid is coated and the coating formed is dried to form a film.

More specifically, a method in which, since the fine metal particles tend to agglomerate compared with fine oxide particles, the solvent composition and so forth of the transparent conductive layer forming coating liquid is appropriately selected so that the fine metal particles may necessarily agglomerate with one another to a certain extent in the course of coating and drying for film formation to obtain the network structure (see Japanese Patent Applications Laid-open No. 9-115438, No. 10-1777, No. 10-142401, No. 10-182191 and so forth); and a method in which an agglomeration-inducing agent, an agglomeration-accelerating high-boiling solvent or the like is intentionally further added to the transparent conductive layer forming coating liquid so as to actively accelerate the agglomeration between fine metal particles in the course of coating and drying to obtain a network structure (see Japanese Patent Applications Laid-open No. 10-110123, No. 2002-38053 and so forth).

(2) Methods of forming the network structure by coating a transparent conductive layer forming coating liquid in which agglomerates of fine metal particles have been dispersed, and drying the coating formed.

More specifically, a method in which a dispersion of fine metal particles having been made to gather in the form they have minute holes (i.e., in the form of rings), without bringing primary particles of the fine metal particles into a uniformly monodisperse state, is used (see Kogyo Zairyo (Industrial Materials), Vol. 44, No. 9, 1996, pp. 68–71); and a method in which a transparent conductive layer forming coating liquid in which chainlike agglomerates comprised of fine metal particles having agglomerated in the form of chains have been dispersed in advance is used (see Japanese Patent Application Laid-open No. 2000-124662).

To compare the methods (1) with the methods (2), the methods (2) have an advantage that a developed network structure can be formed with ease because the agglomerates of fine metal particles have been completed in advance in the transparent conductive layer forming coating liquid.

On the other hand, there may be other problem that filters tend to clog at the time of filtering treatment of the transparent conductive layer forming coating liquid, or that coating film defects may occur if the agglomeration of fine metal particles has proceeded in excess.

However, the above can be said to be preferable methods from the viewpoint that a transparent conductive layer having good conductivity can be formed as long as the agglomerates of fine metal particles that have been formed in advance in the transparent conductive layer forming coating liquid have sufficiently high dispersion stability and the size of the agglomerates has been controlled to be hundreds of micron or less.

Here, in the methods (2), as methods of forming the agglomerates of fine metal particles in advance in the transparent conductive layer forming coating liquid (or a fine-metal-particle dispersion used in producing the transparent conductive layer forming coating liquid), the following methods (a) to (e) are known as disclosed in, e.g., Japanese Patent Applications Laid-open No. 2000-124662, No. 11-329071 and No. 2000-196287.

(a) A method in which a water-soluble salt such as sodium salt, potassium salt, calcium salt or ammonium salt, an acid such as hydrochloric acid, nitric acid, phosphoric acid or acetic acid or an alkali such as sodium hydroxide or ammonia is added to a dispersion of fine metal particles to make the dispersibility of fine metal particles unstable, to form the agglomerates of fine metal particles.

(b) A method in which, at the stage where fine metal particles dispersed in the transparent conductive layer forming coating liquid are prepared from an aqueous solution of a metal salt, the pH and so forth of the aqueous solution are controlled within stated ranges to form the agglomerates of fine metal particles.

(c) A method in which a dispersion of fine metal particles is kept at tens of degree of temperature which is not higher than the boiling point of a dispersion solvent, for several hours to tens of hours to form the agglomerates of fine metal particles.

(d) A method in which an organic compound such as an alcohol is added to a dispersion of fine metal particles to control the polarity of a dispersion solvent, to form the agglomerates of fine metal particles.

(e) A method in which a dispersion of fine metal particles is subjected to mechanical dispersion treatment such as sand mill treatment or impact dispersion treatment to form the agglomerates of fine metal particles.

Now, in the above methods (a) to (d), the methods (a) and (d) are not practical because they are methods in which the dispersion stability of fine metal particles is made to lower (the zeta potential of the system lowers and the stability lowers) to form the agglomerates and hence, if left as it is, the agglomeration may gradually proceed as the fine metal particles are kept unstable. Accordingly, in order to make the stability of the system higher, it is necessary to remove any destabilization factor(s) [in the method (a), the water soluble salt, the acid or the alkali; in the method (d), the organic compound such as an alcohol]. However, this step is so complicated that these methods have not been preferable methods.

The method (c) is a simple method because the dispersion of fine metal particles may only be kept heated. However, such a transparent conductive layer forming coating liquid of the kind that originally the agglomerates are formed by heating at tens of degree of temperature can not be said to ensure high dispersion stability of the fine metal particles themselves contained therein. Hence, there has been a problem that the agglomerates formed have also a low dispersion stability. If on the other hand the fine metal particles themselves have a high dispersion stability, it takes a long time to form the agglomerates by heating at tens of degree of temperature. Thus, this method can not still be said to be practical.

The method (b) is a method in which the agglomerates of fine metal particles are formed at the stage where the fine metal particles are prepared from an aqueous metal salt solution. Hence, there is a problem that the agglomerates further agglomerate one another and settle in, e.g., a concentrating step taken thereafter for preparing the transparent conductive layer forming coating liquid, and further it is necessary to determine the state of agglomeration of fine metal particles in advance. Thus, this method has been inconvenient in that the state of agglomeration of the fine metal particles can not be changed at will in the subsequent stage.

In addition, the method (e) is a method in which mechanical dispersion treatment is carried out to form the agglomerates of fine metal particles, and hence it has had a problem that it requires an expensive treatment equipment and also the step of treatment can not be said to be simple.

SUMMARY OF THE INVENTION

The present invention was made taking note of the above problems. Accordingly, an object of the present invention is to provide, presupposing the transparent conductive layer forming coating liquid in which agglomerates of fine metal particles have been dispersed [i.e., those in the method (2)], a process for producing a noble-metal type fine-particle dispersion by which the noble-metal type fine-particle dispersion used in this transparent conductive layer forming coating liquid can be produced simply and at a low cost.

Another object of the present invention is to provide a transparent conductive layer forming coating liquid which can form on a transparent substrate a transparent conductive layer having superior high-transmittance and low-reflectance characteristics and good conductivity and also has superior storage stability.

Still another object of the present invention is to provide a transparent conductive layered structure formed using this transparent conductive layer forming coating liquid, and a display device having the transparent conductive layered structure.

More specifically, the process for producing a noble-metal type fine-particle dispersion according to the present invention presupposes a process for producing a noble-metal type fine-particle dispersion which contains a solvent and noble-metal type fine particles having an average particle diameter of from 1 nm to 100 nm, having been dispersed in the solvent, and in which a plurality of primary particles of the noble-metal type fine particles stand agglomerated in the form of chains to make up chainlike agglomerates, wherein;

the process comprising the steps of:

an agglomeration step of adding a hydrazine solution to a dispersion in which primary particles of noble-metal type fine particles have been made to stand monodisperse in a solvent, to destabilize the dispersibility of the noble-metal type fine particles in the dispersion and cause the plurality of primary particles in the noble-metal type fine particles to agglomerate in the form of chains to obtain a dispersion of chainlike agglomerates; and a stabilization step of adding a hydrogen peroxide solution to the dispersion of the chainlike agglomerates obtained, to decompose and remove the hydrazine to stabilize the dispersibility of the chainlike agglomerates in the dispersion.

The transparent conductive layer forming coating liquid according to the present invention also presupposes the transparent conductive layer forming coating liquid obtained by the above process for producing a noble-metal type fine-particle dispersion, wherein;

the coating liquid comprises a solvent and chainlike agglomerates of noble-metal-coated fine silver particles, having been dispersed in the solvent, and the chainlike agglomerates of noble-metal-coated fine silver particles comprising a plurality of primary particles having an average particle diameter of from 1 nm to 100 nm which stand agglomerate in the form of chains, and having an average length of from 5 nm to 500 nm.

Then, the transparent conductive layered structure according to the present invention comprises a transparent double-layer film constituted of a transparent conductive layer formed on a transparent substrate by the use of the above transparent conductive layer forming coating liquid and a transparent coat layer formed on this transparent conductive layer by the use of a transparent coat layer forming coating liquid which contains an inorganic binder.

The display device according to the present invention also presupposes a display device having a device main body and a front panel provided on the front side of the device main body, wherein;

the front panel comprises the above transparent conductive layered structure, which is incorporated setting its transparent double-layer film on the outside.

DESCRIPTION OF THE PREFERRED EMBODIMENTS

The present invention is described below in detail.

Specifically, the present invention has been accomplished upon discovery that the addition of a hydrazine ($N_2H_4$) solution to a dispersion of noble-metal type fine particles in which noble-metal type fine particles have been made monodisperse in a solvent makes the dispersibility of the noble-metal type fine particles lower (the zeta potential [absolute value] of the system lowers), so that the noble-metal type fine particles agglomerate in the form of chains to form chainlike agglomerates of the noble-metal type fine particles; that further addition of a hydrogen peroxide ($H_2O_2$) solution thereto makes the hydrazine come decomposed and removed by the action of the hydrogen peroxide, so that the dispersion stability of the chainlike agglomerates is again improved (the zeta potential [absolute value] of the system increases) as the state of their agglomeration is kept unchanged; and also that a series of such reactions bring only water ($H_2O$) and nitrogen gas ($N_2$) as reaction products, as shown by the following reaction scheme (1), and are free from any secondary formation of impurity ions.

$$N_2H_4 + 2H_2O_2 \rightarrow 4H_2O + N_2\uparrow \tag{1}$$

As a specific method of preparing the noble-metal type fine-particle dispersion according to the present invention in which the noble-metal type fine particles make up the chainlike agglomerates, the hydrazine solution and the hydrogen peroxide solution may respectively only be added to a dispersion containing the noble-metal type fine particles standing monodisperse, which is held in, e.g., a glass or plastic container; the former being added stirring the latter by means of a stirrer or the like. Incidentally, these solutions may preferably be added little by little, using a syringe, a pump or the like. Especially in respect of the hydrazine solution, its addition at a time to the dispersion containing the noble-metal type fine particles standing monodisperse is undesirable because there is a possibility of causing excessive agglomeration in some noble-metal type fine particles.

Here, the reason why the addition of the hydrazine solution may cause agglomeration of the noble-metal type fine particles is unclear. It is considered that the dispersion stability of the noble-metal type fine particles lowers because of the action of hydrazine as alkali ions or the action thereof as a reducing agent to lower the redox potential of the system.

As the hydrazine solution, an aqueous solution or organic solution, or a water and organic-solvent mixed solution, of hydrazine or hydrazine monohydrate ($N_2H_4\cdot H_2O$) may be used. Also, as the hydrogen peroxide solution, an aqueous solution or organic solution, or a water and organic-solvent mixed solution, of hydrogen peroxide may be used.

As to the amount of the hydrazine solution to be added, it may arbitrarily be set in accordance with the concentration of the noble-metal type fine particles and the intended degree of agglomeration of the noble-metal type fine particles. For example, in the case of a dispersion of noble-metal type fine particles in which the noble-metal type fine particles are in a concentration of from 1% by weight to 2% by weight, the hydrazine may preferably be added in an amount of from 10 ppm to 500 ppm, and more preferably from 20 ppm to 200 ppm, based on the dispersion of noble-metal type fine particles. If it is less than 10 ppm, the agglomeration of the noble-metal type fine particles may come insufficient. Its addition in an amount of more than 500 ppm is not practical because the agglomeration of the noble-metal type fine particles may proceed in excess. Meanwhile, as to the amount of the hydrogen peroxide solution to be added, it may be in an amount which enables decomposition of the hydrazine added, and may preferably be in a value which is stoichiometric to the hydrazine in the reaction shown by the above reaction scheme (1) However, since the hydrogen peroxide tends to undergo self-decomposition (decomposed into water and oxygen gas), it may be used in an excess amount of, e.g., about 1.5 times the stoichiometric value, without any hindrance.

The state of agglomeration of the chainlike agglomerates in the noble-metal type fine particles obtained by the production process of the present invention is controllable at will by regulating the amount of the hydrazine solution as described above. It is also controllable by regulating the time (retention time) and temperature (retention temperature) by and at which the hydrogen peroxide solution is added after the hydrazine solution has been added. This is because the state in which the dispersion of the noble-metal type fine particles has been destabilized by the hydrazine is maintained until the hydrogen peroxide is added. However, taking account of utility, it is preferable to set the retention time to from several minutes to about 1 hour (preferably from several minutes to about 20 minutes) and the retention temperature to room temperature (e.g., 25° C.), under conditions of which the state of agglomeration of the chainlike agglomerates may be controlled by increasing or decreasing the amount of the hydrazine solution to be added.

Here, the noble-metal type fine-particle dispersion according to the present invention presupposes, as its chief use, the transparent conductive layer forming coating liquid for forming a transparent conductive layer on a transparent substrate. Accordingly, the noble-metal type fine particles in the noble-metal type fine-particle dispersion must have an average particle diameter of from 1 nm to 100 nm. This is because, if they have an average particle diameter of less than 1 nm, it is difficult to produce the fine particles, and at the same time such too fine particles can not be dispersed with ease when made into a coating material, and are not practical. If on the other hand they have an average particle diameter of more than 100 nm, the visible light rays may greatly scatter in the transparent conductive layer formed (i.e., the film may have a high haze value). Incidentally, the average particle diameter herein termed refers to the average particle diameter of primary particles constituting the agglomerates observed on a transmission electron microscope (TEM).

As the noble-metal type fine particles, they may include fine particles of a noble metal selected from gold, silver, platinum, palladium, rhodium and ruthenium; blended fine particles made up of a blend of two or more kinds of fine noble-metal particles; fine alloy particles containing two or more kinds of noble metals; and noble-metal-coated fine silver particles, surface-coated with any of the above noble metals except the silver; any of which may be used.

Here, to compare specific resistance of silver, gold, platinum, rhodium, ruthenium, palladium and so forth, the platinum, rhodium, ruthenium and palladium have a resistivity of 10.6, 4.51, 7.6 and 10.8 μΩ·cm, respectively, which are higher than 1.62 and 2.2 μΩ·cm of silver and gold, respectively. Hence, it is considered advantageous to use fine silver particles or fine gold particles in order to form a transparent conductive layer having a low surface resistance.

The use of fine silver particles, however, imposes a limitation to their use in view of the weatherability that it may cause a great deterioration due to sulfidation or exposure to brine. On the other hand, the use of fine gold particles, fine platinum, particles, fine rhodium particles, fine ruthenium particles or fine palladium particles can eliminate such a problem, but can not necessarily be said to be the best when the cost is taken into account.

Accordingly, as noble-metal type fine particles which fulfill the both conditions of weatherability and cost, they may include noble-metal-coated fine silver particles obtained by coating the surfaces of fine silver particles with noble metal(s) other than silver, as exemplified by noble-metal-coated fine silver particles surface-coated with gold or platinum alone or a composite of gold and platinum. Incidentally, the present inventors have already proposed a transparent conductive layer forming coating liquid which contains such noble-metal-coated fine silver particles, and a process for producing the same (see Japanese Patent Applications Laid-open No. 11-228872 and No. 2000-268639).

Now, where the noble-metal type fine-particle dispersion according to the present invention is used as the transparent conductive layer forming coating liquid which is the former's chief use, a difficulty as stated below may arise if, e.g., the blended fine particles made up of a blend of two or more kinds of fine noble-metal particles are used as the noble-metal type fine particles contained in the transparent conductive layer forming coating liquid.

That is, where two or more kinds of fine noble-metal particles are used in combination as the noble-metal type fine particles contained in the transparent conductive layer forming coating liquid, the respective kinds of fine noble-metal particles tend to localize in the agglomerates because the respective primary particles constituting the agglomerates are comprised of one kind of noble metal, even when the respective kinds of fine noble-metal particles are first agglomerated in the form of chains and then individual dispersions are mixed or the agglomerating treatment is carried out after dispersions in which the individual kinds of fine noble-metal particles stand monodisperse respectively have been mixed.

For this reason, when the transparent conductive layer is formed using the transparent conductive layer forming coating liquid making use of such blended fine particles, the noble metals constituting the blended fine particles are not uniformly present in the transparent conductive layer, so that portions where the respective kinds of fine noble-metal particles have gathered may form to adversely affect the characteristics of the transparent conductive layer formed. For example, portions where fine silver particles have gathered have especially poor weatherability at such portions only, and may adversely affect the overall evaluation of weatherability. Any portions where noble metals having higher specific resistance than silver have gathered also makes the whole surface resistance high.

Accordingly, in the case when the noble-metal type fine-particle dispersion according to the present invention is used as the transparent conductive layer forming coating liquid which is the former's chief use, the noble-metal type fine particles contained in the transparent conductive layer forming coating liquid must be the noble-metal-coated fine silver particles.

Incidentally, in the case when the noble-metal type fine particles contained in the transparent conductive layer forming coating liquid are the noble-metal-coated fine silver particles, noble metals may come into an alloy at the interfaces between the coat layers of noble-metal-coated fine silver particles and the fine silver particles as a result of the heat treatment in the course of film formation, so that there is a case in which the coat layers are not necessarily constituted of only the noble metal other than silver (e.g., only gold, platinum or the like). Even in such a case, however, it follows that each coat layer of each noble-metal-coated fine silver particle is constituted of the same-component alloy, and hence any difficulty caused by the localization stated previously by no means arise.

Then, the noble-metal type fine-particle dispersion according to the present invention, when used as the transparent conductive layer forming coating liquid which is the former's chief use, may be in the state of a coating liquid that the above dispersion can be coated as it is, on the transparent substrate (i.e. the concentration, solvent composition and so forth of the chainlike agglomerates in the noble-metal type fine-particle dispersion have been adjusted to the coating liquid for forming the transparent conductive layer, and hence, using this coating liquid, the transparent conductive layer may directly be formed on the transparent substrate), or may be in the state of a dispersion having the chainlike agglomerates in a high concentration. In the latter case, an organic solvent or the like may be added to the dispersion having the chainlike agglomerates dispersed therein in a high concentration, to make component adjustment (the chainlike-agglomerate concentration, water concentration and various organic solvent concentration in the noble-metal type fine-particle dispersion) so that the coating liquid can be prepared in a concentration which enables direct formation of the transparent conductive layer on the transparent substrate.

In the case when the noble-metal type fine-particle dispersion is used as the transparent conductive layer forming coating liquid, fine color-pigment particles may also be added to the transparent conductive layer forming coating liquid. The mixing of such fine color-pigment particles enables adjustment of the transmittance of the transparent conductive layered structure within a stated range lower than 100% (from 40% to 95%, and commonly from 40% to 75%). Hence, in addition to various characteristics such as good conductivity and low reflectance, the contrast of images can be improved to make display screens easy to watch, or the demand increasing as CRT screens are made flatter as stated previously can be met.

In the transparent conductive layer forming coating liquid making use of the noble-metal type fine-particle dispersion according to the present invention, the noble-metal type fine particles form the chainlike agglomerates in that coating liquid. Thus, in the transparent conductive layer formed using this coating liquid, a good network structure formed of the noble-metal type fine particles is materialized. Hence, the addition of such fine color-pigment particles may cause less hindrance to the conductivity of the transparent conductive layer.

As to the mixing proportion of the fine color-pigment particles, it may be set within the range of from 1 part by weight to 100 parts by weight based on 1.00 parts by weight of the noble-metal type fine particles.

As the fine color-pigment particles, usable are, e.g., fine particles of at least one pigment selected from carbon, titanium black, titanium nitride, a compound oxide pigment, cobalt violet, molybdenum orange, ultramarine blue, iron blue, a quinacridone pigment, a dioxazine pigment, an anthraquinone pigment, a perylene pigment, an isoindolinone pigment, an azo pigment and a phthalocyanine pigment, or fine color-pigment particles whose surfaces have been coated with silicon oxide.

The process for producing the noble-metal type fine-particle dispersion making use of the noble-metal-coated fine silver particles as the noble-metal type fine particles is described below in greater detail.

First, a colloidal dispersion of fine silver particles is made up by a known process [e.g., the Carey-Lea process, Am. J. Sci., 37, 47 (1889), Am. J. Sci., 38 (1889)]. More specifically, a mixed solution of an aqueous iron (II) sulfate solution and an aqueous sodium citrate solution are added to an aqueous silver nitrate solution to carry out reaction, and the resultant sediment is filtered and washed, followed by addition of pure water, whereby a colloidal dispersion of fine silver particles (Ag: 0.1 to 10% by weight) can simply be made up. This colloidal dispersion of fine silver particles may be made up by any method so long as fine silver particles having an average particle diameter of from 1 nm to 100 nm can be dispersed, without any limitation to the above method.

Next, to the colloidal dispersion of fine silver particles thus obtained, a solution containing a reducing agent and a solution selected from any of the following (A) to (C) are each separately dropwise added to thereby coat the surfaces of the fine silver particles with gold or platinum alone or a composite of gold and platinum. Thus, a colloidal dispersion of noble-metal-coated fine silver particles can be obtained (a noble-metal-coated fine silver particle making step).

(A) An alkali metal aurate solution or an alkali metal platinate solution.
(B) An alkali metal aurate solution and an alkali metal platinate solution.
(C) A solution of mixture of an alkali metal aurate and an alkali metal platinate.

In this step of making the noble-metal-coated fine silver particles, a dispersant may optionally be added in a small quantity to at least one of the colloidal dispersion of fine silver particles, the solution containing a reducing agent and any of the solutions (A) to (C), or to each of them.

The colloidal dispersion of noble-metal-coated fine silver particles thus obtained may thereafter preferably be subjected to desalting by dialysis, electrodialysis, ion exchange, ultrafiltration or the like to lower the concentration of the electrolyte in the dispersion. This is because colloids may commonly agglomerate when electrolytes are in a high concentration. This phenomenon is known also as the Schultz-Hardy's rule.

Next, the colloidal dispersion of noble-metal-coated fine silver particles which has been subjected desalting is subjected to concentrating treatment. Thus, a dispersion containing the noble-metal-coated fine silver particles standing monodisperse in a high concentration is obtained.

To this dispersion containing the noble-metal-coated fine silver particles standing monodisperse in a high concentration, the hydrazine solution is added to cause the noble-metal-coated fine silver particles to agglomerate. Thereafter, this is retained, e.g., at room temperature for several minutes to about 1 hour, and then the hydrogen peroxide solution is added thereto. Thus, a noble-metal type fine-particle dispersion in which the chainlike agglomerates of noble-metal-coated fine silver particles stand dispersed in a high concentration is obtained.

In the case when the noble-metal type fine-particle dispersion according to the present invention is used as the transparent conductive layer forming coating liquid, the above chainlike agglomerates must have an average length of from 5 nm to 500 nm. This is because, if they are in an average length of less than 5 nm, the action to promote the formation of the network structure of the transparent conductive layer may be insufficient, and, if they are in an average length of more than 500 nm, the noble-metal-coated fine silver particles (chainlike agglomerates) may come unstable to more tend to agglomerate.

Next, an organic solvent or the like is added to the noble-metal type fine-particle dispersion in which the chainlike agglomerates of noble-metal-coated fine silver particles stand dispersed in a high concentration, to make component adjustment (fine-particle concentration, water concentration, high-boiling-point organic solvent concentration and so forth). Thus, the transparent conductive layer forming coating liquid containing the chainlike agglomerates of noble-metal-coated fine silver particles is obtained.

The concentrating treatment in the colloidal dispersion of the noble-metal-coated fine silver particles may be carried out by a conventional method such as reduced-pressure evaporation or ultrafiltration. By controlling the degree of this concentration, the water concentration in the noble-metal type fine-particle dispersion can be controlled within a stated range.

Here, in the case when the noble-metal type fine-particle dispersion according to the present invention is used as the transparent conductive layer forming coating liquid, the transparent conductive layer forming coating liquid may preferably be component-adjusted so as to contain, as its composition, from 0.1% by weight to 10% by weight of the noble-metal-coated fine silver particles (chainlike agglomerates) and from 1% by weight to 50% by weight of water. If the noble-metal-coated fine silver particles (chainlike agglomerates) are in a content of less than 0.1% by weight, any sufficient conducting performance is not achievable. If on the other hand they are in a content of more than 10% by weight, the noble-metal-coated fine silver particles (chainlike agglomerates) come unstable to more tend to agglomerate. Also, if the water concentration is less than 1% by weight, namely, if the agglomerating treatment is carried out after the degree of concentration of the dispersion containing the noble-metal-coated fine silver particles standing monodisperse has been made greatly higher, the noble-metal-coated fine silver particles (chainlike agglomerates) come unstable to more tend to agglomerate like the above, because the concentration of the noble-metal-coated fine silver particles (chainlike agglomerates) comes too high. If they are in a content of more than 50% by weight, the transparent conductive layer forming coating liquid may have greatly poor coating properties.

As the organic solvent used in the noble-metal type fine-particle dispersion according to the present invention, there are no particular limitations thereon. It may appropriately be selected according to coating methods and film-forming conditions when used as the transparent conductive layer forming coating liquid. It may include, but is not limited to, e.g., alcohol type solvents such as methanol (MA), ethanol (EA), 1-propanol (NPA), isopropanol (IPA), butanol, pentanol, benzyl alcohol and diacetone alcohol; ketone type solvents such as acetone, methyl ethyl ketone (MEK), methyl propyl ketone, methyl isobutyl ketone (MIBK), cyclohexanone and isophorone; glycol derivatives such as ethylene glycol monomethyl ether (MCS), ethylene glycol monoethyl ether (ECS), ethylene glycol isoproyl ether (IPC), propylene glycol methyl ether (PGM), propylene glycol ethyl ether (PE), propylene glycol methyl ether acetate (PGM-AC) and propylene glycol ethyl ether acetate (PE-AC); and formamide (FA), N-methylformamide, dimethylformamide (DMF), dimethylacetamide, dimethyl sulfoxide (DMSO) and N-methyl-2-pyrrolidone (NMP).

Also where a colloidal dispersion of the fine particles of a noble metal selected from gold, silver, platinum, palladium, rhodium and ruthenium, the blended fine particles made up of a blend of two or more kinds of fine noble-metal particles or the fine alloy particles containing two or more kinds of noble metals is used in place of the colloidal dispersion of the noble-metal-coated fine silver particles, the noble-metal type fine-particle dispersion (i.e., the noble-metal type fine-particle dispersion containing the chainlike agglomerates formed of the noble-metal type fine particles standing agglomerate in the form of chains) is obtainable by the production process according to the present invention.

Then, using the transparent conductive layer forming coating liquid making use of the noble-metal type fine-particle dispersion according to the present invention, a transparent conductive layered structure may be obtained the main part of which is constituted of a transparent substrate and a transparent double-layer film consisting of a transparent conductive layer and a transparent coat layer which have been formed on the transparent substrate in order.

To form the transparent double-layer film on the transparent substrate, it may be done by a method described below. That is, the transparent conductive layer forming coating liquid containing the chainlike agglomerates formed of the noble-metal type fine particles standing agglomerated in the form of chains may be coated on the transparent substrate, such as a glass substrate or a plastic substrate, by a coating process such as spin coating, spray coating, wire bar coating or doctor blade coating, optionally followed by drying. Thereafter, a transparent coat layer forming coating liquid containing an inorganic binder such as silica sol may be over-coated (top-coated) by the coating process described above, followed by drying.

Next, the coating formed is subjected to heat treatment at a temperature of about, e.g., 50° C. to 350° C. to cause the coating of the transparent coat layer forming coating liquid to cure to form the transparent double-layer film.

In the case when the transparent conductive layer forming coating liquid according to the present invention, containing the chainlike agglomerates formed of the noble-metal type fine particles standing agglomerated in the form of chains, the noble-metal type fine particles can form conducting paths in a good efficiency in the transparent conductive layer and hence a transparent conductive layer having a very good conductivity can be obtained, compared with cases in which conventional transparent conductive layer forming coating liquids in which individual noble-metal type fine particles do not stand agglomerated are used. In other words, in the case of the transparent conductive layer forming coating liquid containing the chainlike agglomerates formed of the noble-metal type fine particles standing agglomerated in the form of chains, a transparent conductive layer having substantially the same conductivity as the cases in which conventional transparent conductive layer forming coating liquids are used can be obtained even when the content of the noble-metal type fine particles is made vastly low. This makes it possible to vastly lower the cost of the transparent conductive layer forming coating liquid.

Even in the case when the fine color-pigment particles (or a dispersion having the fine color-pigment particles dispersed therein) are mixed in the transparent conductive layer forming coating liquid according to the present invention, it is also possible to add the fine color-pigment particles in a higher concentration than the cases in which the conventional transparent conductive layer forming coating liquids containing noble-metal type fine particles not standing agglomerated are used. This makes it easy to adjust transmittance and at the same time makes it possible to vastly lower the content of the noble-metal type fine particles and also to vastly lower the cost of the transparent conductive layer forming coating liquid.

For the same reason as the reason why the desalting is carried out when the colloidal dispersion of noble-metal-coated fine silver particles described previously are produced, it is preferable that the desalting is thoroughly carried out in advance also in respect of the dispersion of the fine color-pigment particles which is to be mixed in the transparent conductive layer forming coating liquid.

When the transparent coat layer forming coating liquid containing the inorganic binder such as silica sol is over-coated by the above coating process, the silica sol thus over-coated (this silica sol turns into a binder matrix composed chiefly of silicon oxide as a result of the heating) soaks into the part of openings (spaces) of the network structure in the noble-metal type fine-particle layer formed previously. Thus, an improvement in transmittance and an improvement in conductivity can simultaneously be achieved.

An improvement in strength can also be achieved because the area of contact between the transparent substrate and the binder matrix of silicon oxide enlarges via the part of openings of the network structure and hence the transparent substrate and the binder matrix combine strongly.

Moreover, the transparent double-layer film structure constituted of the transparent conductive layer and the transparent coat layer can make the reflectance of the transparent double-layer film greatly low, because the transparent conductive layer having the noble-metal-coated fine silver particles dispersed in the binder matrix composed chiefly of silicon oxide has, in its optical constant (n−ik), a refractive index n which is not so great but has a great extinction coefficient.

As the silica sol to be contained in the transparent coat layer forming coating liquid, usable are a polymeric product obtained by adding water and an acid catalyst to an orthoalkyl-silicate to effect hydrolysis followed by dehydropolycondensation further made to proceed, and a polymeric product obtained by subjecting a commercially available alkyl-silicate solution having already been subjected to hydrolysis and polycondensation made to proceed up to a 4- to 5-mer (tetramer to pentamer), to hydrolysis and dehydropolycondensation further made to proceed. Since the solution viscosity increases with progress of dehydropolycondensation to finally make the product solidify, the degree of dehydropolycondensation may be so controlled as to be not higher than the maximum viscosity at which the coating liquid can be coated on the transparent substrate such as a glass substrate or a plastic substrate. Here, the degree of dehydropolycondensation is not particularly specified so long as it is kept at a level not higher than the maximum viscosity, but may preferably be from about 500 to about 3,000 as weight-average molecular weight, taking account of film strength, weatherability and so forth. Then, the dehydropolycondensation is substantially completed at the time the transparent double-layer film is heated and baked, and the alkyl-silicate hydrolyzed polymeric product turns into a hard silicate film (a film composed chiefly of silicon oxide).

To the silica sol, fine magnesium fluoride particles, an alumina sol, a titania sol or a zirconia sol may be added so that the refractive index of the transparent coat layer can be controlled to change the reflectance of the transparent double-layer film.

Thus, according to the process for producing the noble-metal type fine-particle dispersion according to the present invention, the process has the steps of i) an agglomeration step of adding a hydrazine solution to a dispersion in which primary particles of noble-metal type fine particles have been made to stand monodisperse in a solvent, to destabilize the dispersibility of the noble-metal type fine particles in the dispersion and cause the plurality of primary particles in the noble-metal type fine particles to agglomerate in the form of chains to obtain a dispersion of chainlike agglomerates, and ii) a stabilization step of adding a hydrogen peroxide solution to the dispersion of the chainlike agglomerates obtained, to decompose and remove the hydrazine to stabilize the dispersibility of the chainlike agglomerates in the dispersion. In a series of these steps, the reaction products are only water ($H_2O$) and nitrogen gas ($N_2$) and are free from any secondary formation of impurity ions.

Hence, the process has the effect that the noble-metal type fine-particle dispersion usable as the transparent conductive layer forming coating liquid which can form the transparent conductive layer having superior high-transmittance and low-reflectance characteristics and good conductivity and also has superior storage stability can be produced simply and at a low cost.

The transparent conductive layer forming coating liquid obtained by the production process according to the present invention also has the effect that, since the noble-metal-coated fine silver particles formed by coating fine silver particles with noble metal are used as primary particles and such fine particles are made to stand agglomerated in the form of chains, the transparent conductive layer having very good conductivity in addition to various characteristics such as high transmittance and low reflectance can be formed even when the noble-metal-coated fine silver particles in the transparent conductive layer forming coating liquid are in a small content, and also that the coating liquid has superior storage stability.

In addition, since the transparent conductive layer formed using this transparent conductive layer forming coating liquid has very good conductivity in addition to various characteristics such as high transmittance and low reflectance, the transparent conductive layered structure having this transparent conductive layer can be used in front panels of display devices such as cathode ray tubes (CRT), plasma display panels (PDP), fluorescent display (VFD) devices, field emission display (FED) devices, electroluminescence display (ELD) devices and liquid-crystal display (LCD) devices.

Moreover, in addition to various characteristics such as good conductivity and low reflectance, the transmittance of the transparent conductive layer can be adjusted at will by mixing the fine color-pigment particles in this transparent conductive layer forming coating liquid, and hence, for example, the contrast of images can be improved to make display screens easy to watch, or the demand increasing as CRT screens are made flatter as stated previously can be met.

The present invention is described below in greater detail by giving Examples. The present invention is by no means limited to these Examples. In the following, "%" refers to "% by weight" except for "%" of transmittance, reflectance and haze value, and "part (s)" refers to "part (s) by weight".

EXAMPLE 1

A colloidal dispersion of fine silver particles was made up by the Carey-Lea process described previously.

Stated specifically, to 330 g of an aqueous 9% silver nitrate solution, a mixed solution of 390 g of an aqueous 23% iron (II) sulfate solution and 480 g of an aqueous 37.5% sodium citrate solution was added, and thereafter the sediment formed was filtered and washed, followed by addition of pure water to make up a colloidal dispersion of fine silver particles (Ag: 0.15%).

To 600 g of this colloidal dispersion of fine silver particles, 80.0 g of an aqueous 1% solution of hydrazine monohydrate ($N_2H_4 \cdot H_2O$) was added, and a mixed solution of 4,800 g of an aqueous potassium aurate $KAu(OH)_4$ solution (Au: 0.075%) and 2.0 g of an aqueous 1% polymeric dispersant solution was further added with stirring to obtain a colloidal dispersion of noble-metal-coated fine silver particles coated with gold alone.

This colloidal dispersion of noble-metal-coated fine silver particles was desalted with an ion-exchange resin (available from Mitsubishi Chemical Industries Limited; trade name: DIAION SK1B, SA20AP), followed by ultrafiltration to effect concentration of the colloidal dispersion of noble-metal-coated fine silver particles. To the resultant dispersion, ethanol (EA) were added to obtain a dispersion containing the noble-metal-coated fine silver particles standing monodisperse in a high concentration (Ag—Au: 1.6%; water: 20.0%; EA: 78.4%) (liquid B).

Next, stirring 60 g of the liquid B, 0.8 g of a hydrazine solution ($N_2H_4 \cdot H_2O$: 0.75%) (0.8 g corresponding to 100 ppm of hydrazine, based on the 1.6% Ag—Au dispersion) was added thereto over a period of 1 minute. Thereafter, this was retained at room temperature for 15 minutes, followed by further addition of 0.6 g of a hydrogen peroxide solution ($H_2O_2$: 1.5%) over a period of 1 minute to obtain a noble-metal type fine-particle dispersion according to Example 1 (liquid C), in which chainlike agglomerates of the noble-metal-coated fine silver particles stood disperse in a high concentration.

Incidentally, as to i) the lowering of dispersion stability in respect of the noble-metal-coated fine silver particles when the hydrazine solution was added to the dispersion (liquid B) containing the noble-metal-coated fine silver particles standing monodisperse in a high concentration and ii) the improvement in dispersion stability in respect of the chainlike agglomerates when the hydrogen peroxide solution was added to the dispersion containing the noble-metal-coated fine silver particles standing agglomerated, these have scientifically been ascertained from the measurements of zeta potentials of the respective dispersions.

Next, to the noble-metal type fine-particle dispersion according to Example 1 (liquid C), acetone, ethanol (EA), propylene glycol monomethyl ether (PGM), diacetone alcohol (DAA) and formamide (FA) were added to obtain a transparent conductive layer forming coating liquid according to Example 1 (Ag: 0.03%; Au: 0.12%; water: 1.9%; acetone: 40%; EA: 37.9%; PGM: 15%; DAA: 5%; FA: 0.03%), containing the chainlike agglomerates of noble-metal-coated fine silver particles and prepared in a concentration enabling the coating liquid to be directly used to form the transparent conductive layer.

This transparent conductive layer forming coating liquid was observed on a transmission electron microscope to reveal that the chainlike agglomerates of noble-metal-coated fine silver particles were formed of noble-metal-coated fine silver particles of about 6 nm in primary particle diameter which stood strung in strings of beads and also had partially branched shapes [length: 100 nm to 300 nm (the maximum value of length in individual chainlike agglomerates); average length: 200 nm].

Next, the transparent conductive layer forming coating liquid containing the chainlike agglomerates of noble-metal-coated fine silver particles was filtered with a filter of 5 μm in filtering precision (pore size). Thereafter, this was spin-coated (at 90 rpm for 10 seconds and 120 rpm for 80 seconds) on a glass substrate (soda-lime glass of 3 mm thick) heated to 35° C., and subsequently a silica sol was spin-coated thereon (at 150 rpm for 60 seconds), further followed by heat treatment at 180° C. for 20 minutes to obtain a glass substrate provided with a transparent double-layer film constituted of a transparent conductive layer containing the noble-metal-coated fine silver particles in well-developed network structure and a transparent coat layer formed of a silicate film composed chiefly of silicon oxide, i.e., a transparent conductive layered structure according to Example 1.

The above glass substrate was polished with a cerium oxide type polishing agent before use, and was used after the polished one was cleaned with pure water, dried and thereafter heated to 35° C.

Here, the above silica sol was made up using 19.6 parts of Methyl-silicate 51 (trade name; available from Colcoat Co., Ltd.), 57.8 parts of ethanol, 7.9 parts of an aqueous 1% nitric acid solution and 14.7 parts of pure water, to obtain one having $SiO_2$ (silicon oxide) solid content concentration of 10% and a weight-average molecular weight of 1,050 (silica sol: liquid D), which was finally diluted with a mixture of isopropyl alcohol (IPA) and n-butanol (NBA) (IPA/NBA=3/1) so as to have the $SiO_2$ solid content concentration of 0.8%.

Film characteristics (surface resistance, visible light ray transmittance, haze value, and bottom reflectance/bottom wavelength) of the transparent double-layer film formed on the glass substrate are shown in Table 1 below. Here, the bottom reflectance is meant to be the minimum reflectance in the reflection profile of the transparent conductive layered structure, and the bottom wavelength the wavelength at the minimum reflectance.

Transmittance shown in Table 1 in respect of only the transparent double-layer film, excluding the transparent substrate (glass substrate) is determined in the following way:

Transmittance (%) of only transparent double-layer film, excluding transparent substrate (glass substrate)=[(transmittance measured on the whole structure inclusive of transparent substrate)/(transmittance of transparent substrate)]×100

Here, in the present specification, unless particularly noted, the value obtained by measuring transmittance of only the transparent double-layer film, excluding that of the transparent substrate, is used as the transmittance.

The surface resistance of the transparent double-layer film was also measured with a surface resistance meter LORESTA AP (MCP-T400), manufactured by Mitsubishi Chemical Corporation. The haze value and the visible light ray transmittance was measured with a haze meter (HR-200, a reflectance-transmittance meter) manufactured by Murakami Color Research Laboratory. The reflectance was measured with a spectrophotometer (U-4000) manufactured by Hitachi Ltd. The shape of chainlike agglomerates and particle size (length) in respect of the noble-metal-coated fine silver particles were observed on a transmission electron microscope manufactured by JEOL, Ltd.

EXAMPLE 2

5 g of fine titanium nitride (TiN) particles (available from Netsuren Co., Ltd.) and 5 g of the silica sol (liquid D) prepared in Example 1 were mixed with 20 g of pure water and 70 g of ethanol, and these were subjected to paint shaker dispersion together with zirconia beads, followed by desalting with the ion exchange resin used in Example 1, to obtain a dispersion of silicon-oxide-coated fine titanium nitride particles of 85 nm in dispersed-particle diameter (liquid E), surface coated with silicon oxide.

Next, to the noble-metal type fine-particle dispersion according to Example 1 (liquid C), the above liquid E, acetone, ethanol (EA), propylene glycol monomethyl ether (PGM), diacetone alcohol (DAA) and formamide (FA) were added to obtain a transparent conductive layer forming coating liquid according to Example 2 (Ag: 0.04%; Au: 0.16%; TiN: 0.15%; water: 3.1%; acetone: 40%; EA: 36.5%; PGM: 15%; DAA: 5%; FA: 0.03%), containing the chainlike agglomerates of noble-metal-coated fine silver particles and the fine titanium nitride particles and prepared in a concentration enabling the coating liquid to be directly used to form the transparent conductive layer.

This transparent conductive layer forming coating liquid was observed on a transmission electron microscope to reveal that the fine titanium nitride particles had an average particle diameter of 20 nm.

Then, the subsequent procedure in Example 1 was repeated but using this transparent conductive layer forming coating liquid, to obtain a glass substrate provided with a transparent double-layer film constituted of a transparent conductive layer containing the noble-metal-coated fine silver particles in well-developed network structure and the fine titanium nitride particles and a transparent coat layer formed of a silicate film composed chiefly of silicon oxide, i.e., a transparent conductive layered structure according to Example 2.

Film characteristics (surface resistance, visible light ray transmittance, haze value, and bottom reflectance/bottom wavelength) of the transparent double-layer film formed on the glass substrate are shown in Table 1 below.

COMPARATIVE EXAMPLE 1

To the liquid B in Example 1 (dispersion containing the noble-metal-coated fine silver particles standing monodisperse in a high concentration), acetone, ethanol (EA), propylene glycol monomethyl ether (PGM), diacetone alcohol (DAA) and formamide (FA) were added to obtain a transparent conductive layer forming coating liquid according to Comparative Example 1 (Ag: 0.03%; Au: 0.12%; water: 1.9%; acetone: 40%; EA: 37.9%; PGM: 15%; DAA: 5%; FA: 0.03%), containing noble-metal-coated fine silver particles having individual fine particles not standing agglomerate, and prepared in a concentration enabling the coating liquid to be directly used to form the transparent conductive layer.

Then, the subsequent procedure in Example 1 was repeated but using this transparent conductive layer forming coating liquid, to obtain a glass substrate provided with a transparent double-layer film constituted of a transparent conductive layer containing the noble-metal-coated fine silver particles and a transparent coat layer formed of a silicate film composed chiefly of silicon oxide, i.e., a transparent conductive layered structure according to Comparative Example 1.

Film characteristics (surface resistance, visible light ray transmittance, haze value, and bottom reflectance/bottom wavelength) of the transparent double-layer film formed on the glass substrate are shown in Table 1 below.

COMPARATIVE EXAMPLE 2

The liquid B in Example 1 (dispersion containing the noble-metal-coated fine silver particles standing monodisperse in a high concentration) and the liquid E in Example 2 (dispersion of silicon-oxide-coated fine titanium nitride particles) were used to obtain a transparent conductive layer forming coating liquid according to Comparative Example 2 (Ag: 0.04%; Au: 0.16%; TiN: 0.15%; water: 3.1%; acetone: 40%; EA: 36.5%; PGM: 15%; DAA: 5%; FA: 0.03%), containing noble-metal-coated fine silver particles having individual fine particles not standing agglomerate and the fine titanium nitride particles, and prepared in a concentration enabling the coating liquid to be directly used to form the transparent conductive layer.

Then, the subsequent procedure in Example 2 was repeated but using this transparent conductive layer forming coating liquid, to obtain a glass substrate provided with a transparent double-layer film constituted of a transparent conductive layer containing the noble-metal-coated fine silver particles and the fine titanium nitride particles and a transparent coat layer formed of a silicate film composed chiefly of silicon oxide, i.e., a transparent conductive layered structure according to Comparative Example 2.

Film characteristics (surface resistance, visible light ray transmittance, haze value, and bottom reflectance/bottom wavelength) of the transparent double-layer film formed on the glass substrate are shown in Table 1 below.

Table 1

Stability Test on Dispersions:

In Examples 1 and 2, glass substrates each provided with a transparent double-layer film constituted of a transparent conductive layer containing the noble-metal-coated fine silver particles in well-developed network structure and a transparent coat layer formed of a silicate film composed chiefly of silicon oxide were obtained in the same manner as in these Examples except that the noble-metal type fine-particle dispersion (liquid C), in which the chainlike agglomerates of noble-metal-coated fine silver particles stood disperse in a high concentration, was left at room temperature for 2 weeks and thereafter prepared in a concentration suited for the formation of the transparent conductive layer.

The film characteristics of these transparent double-layer films formed on the glass substrates were equal to those in Examples 1 and 2.

Evaluation:

1. The following is ascertained from the results shown in Table 1.

First, it is ascertained that, while the transparent double-layer films according to Comparative Examples 1 and 2, making use of the transparent conductive layer forming coating liquid containing noble-metal-coated fine silver particles having individual fine particles not standing agglomerate, have surface resistance of $10^6$ Ω/square or more, the transparent double-layer films according to Examples 1 and 2 have surface resistance of 870 Ω/square to 965 Ω/square, having superior conductivity, thus a remarkable improvement in film characteristics has been brought by the present invention.

From a different point of view, this fact show the following: In the transparent conductive layer forming coating liquids of Comparative Examples 1 and 2, containing noble-metal-coated fine silver particles having individual fine particles not standing agglomerate, the content of the noble-metal-coated fine silver particles in the coating liquid must be vastly high in order to attain practical film resistance value (several kΩ/square or less). On the other hand, in the transparent conductive layer forming coating liquids of Examples 1 and 2, in which the chainlike agglomerates of noble-metal-coated fine silver particles have been dispersed, the content of noble metal may be set as low as from 0.15% to 0.2%.

Thus, the process for producing the noble-metal type fine-particle dispersion according to the present invention not only has simpler production steps than the conventional methods discussed previously, but also has an advantage that inexpensive transparent conductive layer forming coating liquids can be provided.

2. From the results of the stability test on dispersions, it is also ascertained that the noble-metal type fine-particle dispersion in which the chainlike agglomerates of noble-metal-coated fine silver particles stand disperse in a high concentration does not show any deterioration when used as the transparent conductive layer forming coating liquid, even though it has been left at room temperature for 2 weeks, and has superior storage stability.

That is, superiority over the conventional methods discussed previously can be ascertained in the process for producing the noble-metal type fine-particle dispersion according to the present invention.

EXAMPLE 3

A dispersion containing noble-metal-coated fine silver particles standing monodisperse in a high concentration (Ag—Au: 1.6%; water: 20.0%; EA: 78.4%) (liquid F) was obtained in the same manner as the manner of obtaining the liquid B in Example 1.

Next, stirring 60 g of this liquid F, 0.8 g of a hydrazine solution ($N_2H_4 \cdot H_2O$: 0.5%) (0.8 g corresponding to 67 ppm of hydrazine, based on the 1.6% Ag—Au dispersion) was added thereto over a period of 1 minute. Thereafter, this was retained at room temperature for 15 minutes, followed by further addition of 0.6 g of a hydrogen peroxide solution ($H_2O_2$: 1.0%) over a period of 1 minute to obtain a noble-metal type fine-particle dispersion according to Example 3 (liquid G), in which chainlike agglomerates of the noble-metal-coated fine silver particles stood disperse in a high concentration.

To this liquid G, ethanol (EA), propylene glycol monomethyl ether (PGM), diacetone alcohol (DAA) and formamide (FA) were added to obtain a transparent conductive layer forming coating liquid according to Example 3 (Ag: 0.08%; Au: 0.32%; water: 10%; EA: 54.5%; PGM: 25%; DAA: 10%; FA: 0.1%), containing the chainlike agglomerates of noble-metal-coated fine silver particles and prepared in a concentration enabling the coating liquid to be directly used to form the transparent conductive layer.

This transparent conductive layer forming coating liquid was observed on a transmission electron microscope to reveal that the chainlike agglomerates of noble-metal-coated fine silver particles were formed of noble-metal-coated fine silver particles of about 6 nm in primary particle diameter which stood strung in strings of beads and also had partially branched shapes [length: 20 nm to 100 nm (the maximum value of length in individual chainlike agglomerates); average length: 50 nm].

Next, this coating liquid was spin-coated (at 90 rpm for 10 seconds and 130 rpm for 80 seconds) on a glass substrate (soda-lime glass of 3 mm thick) heated to 35° C., and subsequently the silica sol in Example 1 (the one obtained by diluting the liquid D and finally made to have $SiO_2$ solid content concentration of 0.8%) was spin-coated thereon (at 150 rpm for 60 seconds). Except for these, the corresponding procedure in Example 1 was repeated to obtain a glass substrate provided with a transparent double-layer film constituted of a transparent conductive layer containing the noble-metal-coated fine silver particles in well-developed network structure and a transparent coat layer formed of a silicate film composed chiefly of silicon oxide, i.e., a transparent conductive layered structure according to Example 3.

Film characteristics (surface resistance, visible light ray transmittance and haze value) of the transparent double-layer film formed on the glass substrate are shown in Table 2 below.

EXAMPLE 4

To the liquid G in Example 3 (noble-metal type fine-particle dispersion in which the chainlike agglomerates of noble-metal-coated fine silver particles stood disperse in a high concentration), ethanol (EA), propylene glycol monomethyl ether (PGM), diacetone alcohol (DAA) and formamide (FA) were added to obtain a transparent conductive layer forming coating liquid according to Example 4 (Ag: 0.04%; Au: 0.16%; water: 10%; EA: 54.5%; PGM: 25%; DAA: 10%; FA: 0.1%), containing the chainlike agglomerates of noble-metal-coated fine silver particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and a transparent coat layer formed of a silicate film composed chiefly of silicon oxide, i.e., a transparent conductive layered structure according to Example 4.

Film characteristics (surface resistance, visible light ray transmittance and haze value) of the transparent double-layer film formed on the glass substrate are shown in Table 2 below.

EXAMPLE 5

Stirring 60 g of the liquid F prepared in Example 3 (dispersion containing the noble-metal-coated fine silver particles standing monodisperse in a high concentration), 0.8 g of a hydrazine solution ($N_2H_4 \cdot H_2O$: 0.75%) (0.8 g corresponding to 100 ppm of hydrazine, based on the 1.6% Ag—Au dispersion) was added thereto over a period of 1 minute. Thereafter, this was retained at room temperature for 15 minutes, followed by further addition of 0.6 g of a hydrogen peroxide solution ($H_2O_2$: 1.5%) over a period of 1 minute to obtain a noble-metal type fine-particle dispersion according to Example 1 (liquid H), in which chainlike agglomerates of the noble-metal-coated fine silver particles stood disperse in a high concentration.

Incidentally, as to i) the lowering of dispersion stability in respect of the noble-metal-coated fine silver particles when the hydrazine solution was added to the dispersion (liquid F) containing the noble-metal-coated fine silver particles standing monodisperse in a high concentration and ii) the improvement in dispersion stability in respect of the chainlike agglomerates when the hydrogen peroxide solution was added to the dispersion containing the noble-metal-coated fine silver particles standing agglomerate, these have scientifically been ascertained from the measurements of zeta potentials of the respective dispersions.

Next, to this liquid H, ethanol (EA), propylene glycol monomethyl ether (PGM), diacetone alcohol (DAA) and formamide (FA) were added to obtain a transparent conductive layer forming coating liquid according to Example 5 (Ag: 0.08%; Au: 0.32%; water: 10%; EA: 54.5%; PGM: 25%; DAA: 10%; FA: 0.1%), containing the chainlike agglomerates of noble-metal-coated fine silver particles and prepared in a concentration enabling the coating liquid to be directly used to form the transparent conductive layer.

This transparent conductive layer forming coating liquid was observed on a transmission electron microscope to reveal that the chainlike agglomerates of noble-metal-coated fine silver particles were formed of noble-metal-coated fine silver particles of about 6 nm in primary particle diameter which stood strung in strings of beads and also had partially branched shapes [length: 100 nm to 500 nm (the maximum value of length in individual chainlike agglomerates); average length: 250 nm].

Next, on a glass substrate (soda-lime glass of 3 mm thick), the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and a transparent coat layer formed of a silicate film composed chiefly of silicon oxide, i.e., a transparent conductive layered structure according to Example 5.

Film characteristics (surface resistance, visible light ray transmittance and haze value) of the transparent double-layer film formed on the glass substrate are shown in Table 2 below.

EXAMPLE 6

To the liquid H in Example 5 (dispersion in which the chainlike agglomerates of noble-metal-coated fine silver particles stood disperse in a high concentration), ethanol (EA), propylene glycol monomethyl ether (PGM), diacetone alcohol (DAA) and formamide (FA) were added to obtain a transparent conductive layer forming coating liquid according to Example 6 (Ag: 0.04%; Au: 0.16%; water: 10%; EA: 54.5%; PGM: 25%; DAA: 10%; FA: 0.1%), containing the chainlike agglomerates of noble-metal-coated fine silver particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and a transparent coat layer formed of a silicate film composed chiefly of silicon oxide, i.e., a transparent conductive layered structure according to Example 6.

Film characteristics (surface resistance, visible light ray transmittance and haze value) of the transparent double-layer film formed on the glass substrate are shown in Table 2 below.

COMPARATIVE EXAMPLE 3

To the liquid F in Example 3 (dispersion containing the noble-metal-coated fine silver particles standing monodisperse in a high concentration), ethanol (EA), propylene glycol monomethyl ether (PGM), diacetone alcohol (DAA) and formamide (FA) were added to obtain a transparent conductive layer forming coating liquid according to Comparative Example 3 (Ag: 0.08%; Au: 0.32%; water: 10%; EA: 54.5%; PGM: 25%; DAA: 10%; FA: 0.1%), containing noble-metal-coated fine silver particles having individual fine particles not standing agglomerate, and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles and a transparent coat layer formed of a silicate film composed chiefly of silicon oxide, i.e., a transparent conductive layered structure according to Comparative Example 3.

Film characteristics (surface resistance, visible light ray transmittance and haze value) of the transparent double-layer film formed on the glass substrate are shown in Table 2 below.

COMPARATIVE EXAMPLE 4

To the liquid F in Example 3, ethanol (EA), propylene glycol monomethyl ether (PGM), diacetone alcohol (DAA) and formamide (FA) were added to obtain a transparent conductive layer forming coating liquid according to Comparative Example 4 (Ag: 0.04%; Au: 0.16%; water: 10%; EA: 54.5%; PGM: 25%; DAA: 10%; FA: 0.1%), containing noble-metal-coated fine silver particles having individual fine particles not standing agglomerate, and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles and a transparent coat layer formed of a silicate film composed chiefly of silicon oxide, i.e., a transparent conductive layered structure according to Comparative Example 4.

Film characteristics (surface resistance, visible light ray transmittance and haze value) of the transparent double-layer film formed on the glass substrate are shown in Table 2 below.

EXAMPLE 7

To the liquid G in Example 3 (noble-metal type fine-particle dispersion in which the chainlike agglomerates of noble-metal-coated fine silver particles stood disperse in a high concentration), the liquid E in Example 2 (dispersion of silicon-oxide-coated fine titanium nitride particles), acetone, ethanol (EA), propylene glycol monomethyl ether (PGM), diacetone alcohol (DAA) and formamide (FA) were added to obtain a transparent conductive layer forming coating liquid according to Example 7 (Ag: 0.072%; Au: 0.288%; TiN: 0.09%; water: 10%; acetone: 40%; EA: 29.52%; PGM: 15%; DAA: 5%; FA: 0.03%), containing the chainlike agglomerates of noble-metal-coated fine silver particles and the fine titanium nitride particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and the fine titanium nitride particles and a transparent coat layer formed of a silicate film composed chiefly of silicon oxide, i.e., a transparent conductive layered structure according to Example 7.

Film characteristics (surface resistance, visible light ray transmittance and haze value) of the transparent double-layer film formed on the glass substrate are shown in Table 3 below.

EXAMPLE 8

To the liquid G in Example 3, the liquid E in Example 2, acetone, ethanol (EA), propylene glycol monomethyl ether (PGM), diacetone alcohol (DAA) and formamide (FA) were added to obtain a transparent conductive layer forming coating liquid according to Example 8 (Ag: 0.052%; Au: 0.208%; TiN: 0.13%; water: 10%; acetone: 40%; EA: 29.58%; PGM: 15%; DAA: 5%; FA: 0.03%), containing the chainlike agglomerates of noble-metal-coated fine silver particles and the fine titanium nitride particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and the fine titanium nitride particles and a transparent coat layer formed of a silicate film composed chiefly of silicon oxide, i.e., a transparent conductive layered structure according to Example 8.

Film characteristics (surface resistance, visible light ray transmittance and haze value) of the transparent double-layer film formed on the glass substrate are shown in Table 3 below.

EXAMPLE 9

To the liquid H in Example 5 (noble-metal type fine-particle dispersion in which the chainlike agglomerates of noble-metal-coated fine silver particles stood disperse in a high concentration), the liquid E in Example 2, acetone, ethanol (EA), propylene glycol monomethyl ether (PGM), diacetone alcohol (DAA) and formamide (FA) were added to obtain a transparent conductive layer forming coating liquid according to Example 9 (Ag: 0.072%; Au: 0.288%; TiN: 0.09%; water: 10%; acetone: 40%; EA: 29.52%; PGM: 15%; DAA: 5%; FA: 0.03%), containing the chainlike agglomerates of noble-metal-coated fine silver particles and the fine titanium nitride particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and the fine titanium nitride particles and a transparent coat layer formed of a silicate film composed chiefly of silicon oxide, i.e., a transparent conductive layered structure according to Example 9.

Film characteristics (surface resistance, visible light ray transmittance and haze value) of the transparent double-layer film formed on the glass substrate are shown in Table 3 below.

EXAMPLE 10

To the liquid H in Example 5, the liquid E in Example 2, acetone, ethanol (EA), propylene glycol monomethyl ether (PGM), diacetone alcohol (DAA) and formamide (FA) were added to obtain a transparent conductive layer forming coating liquid according to Example 10 (Ag: 0.052%; Au: 0.208%; TiN: 0.13%; water: 10%; acetone: 40%; EA: 29.58%; PGM: 15%; DAA: 5%; FA: 0.03%), containing the chainlike agglomerates of noble-metal-coated fine silver particles and the fine titanium nitride particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and the fine titanium nitride particles and a transparent coat layer formed of a silicate film composed chiefly of silicon oxide, i.e., a transparent conductive layered structure according to Example 10.

Film characteristics (surface resistance, visible light ray transmittance and haze value) of the transparent double-layer film formed on the glass substrate are shown in Table 3 below.

EXAMPLE 11

To the liquid H in Example 5, the liquid E in Example 2, acetone, ethanol (EA), propylene glycol monomethyl ether (PGM), diacetone alcohol (DAA) and formamide (FA) were added to obtain a transparent conductive layer forming coating liquid according to Example 11 (Ag: 0.04%; Au: 0.16%; TiN: 0.14%; water: 10%; acetone: 40%; EA: 29.63%; PGM: 15%; DAA: 5%; FA: 0.03%), containing the chainlike agglomerates of noble-metal-coated fine silver particles and the fine titanium nitride particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure and the fine titanium nitride particles and a transparent coat layer formed of a silicate film composed chiefly of silicon oxide, i.e., a transparent conductive layered structure according to Example 11.

Film characteristics (surface resistance, visible light ray transmittance and haze value) of the transparent double-layer film formed on the glass substrate are shown in Table 3 below.

EXAMPLE 12

1 g of fine blue-pigment particles with an average particle diameter of 20 nm (Phthalocyanine Blue #5203, available from Dainichiseika Color & Chemicals Mfg. Co., Ltd.) and 2 g of the liquid D (silica sol) prepared in Example 1 were mixed with 97 g of ethanol, and these were subjected to paint shaker dispersion together with zirconia beads, followed by desalting with the ion exchange resin used in Example 1, to obtain a dispersion of silicon-oxide-coated fine Phthalocyanine Blue particles of 99 nm in dispersed-particle diameter (liquid I).

TEM observation of the silicon-oxide-coated fine Phthalocyanine Blue particles ascertained that the fine Phthalocyanine Blue particles stood coated with silicon oxide.

Next, 5 g of fine red-pigment particles (Quinacridone #44, available from Dainichiseika Color & Chemicals Mfg. Co., Ltd.) and 0.5 g of a dispersant were mixed with 94.5 g of diacetone alcohol (DAA), and thereafter these were subjected to paint shaker dispersion together with zirconia beads to obtain a dispersion of fine red-pigment particles of 135 nm in dispersed-particle diameter (liquid J).

Next, to the liquid H in Example 5 (noble-metal type fine-particle dispersion in which the chainlike agglomerates of noble-metal-coated fine silver particles stood disperse in a high concentration), the above liquid I and liquid J, ethanol (EA), propylene glycol monomethyl ether (PGM), diacetone alcohol (DAA) and formamide (FA) were added to obtain a transparent conductive layer forming coating liquid according to Example 12 (Ag: 0.06%; Au: 0.24%; Phthalocyanine Blue: 0.04%; Quinacridone: 0.1%; water: 6.5%; EA: 63.0%; PGM: 20%; DAA: 10%; FA: 0.05%), containing the chainlike agglomerates of noble-metal-coated fine silver particles, the fine Phthalocyanine Blue particles and the fine Quinacridone particles and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles in well-developed network structure, the fine Phthalocyanine Blue particles and the fine Quinacridone particles and a transparent coat layer formed of a silicate film composed chiefly of silicon oxide, i.e., a transparent conductive layered structure according to Example 12.

Film characteristics (surface resistance, visible light ray transmittance and haze value) of the transparent double-layer film formed on the glass substrate are shown in Table 3 below.

COMPARATIVE EXAMPLE 5

To the liquid F in Example 3 (dispersion containing the noble-metal-coated fine silver particles standing monodisperse in a high concentration), the liquid E in Example 2 (dispersion of silicon-oxide-coated fine titanium nitride particles), acetone, ethanol (EA), propylene glycol monomethyl ether (PGM), diacetone alcohol (DAA) and formamide (FA) were added to obtain a transparent conductive layer forming coating liquid according to Comparative Example 5 (Ag: 0.072%; Au: 0.288%; TiN: 0.09%; water: 10%; acetone: 40%; EA: 29.52%; PGM: 15%; DAA: 5%; FA: 0.03%), containing noble-metal-coated fine silver particles having individual fine particles not standing agglomerate and the fine titanium nitride particles, and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles and the fine titanium nitride particles and a transparent coat layer formed of a silicate film composed chiefly of silicon oxide, i.e., a transparent conductive layered structure according to Comparative Example 5.

Film characteristics (surface resistance, visible light ray transmittance and haze value) of the transparent double-layer film formed on the glass substrate are shown in Table 3 below.

COMPARATIVE EXAMPLE 6

To the liquid F in Example 3 (dispersion containing the noble-metal-coated fine silver particles standing monodisperse in a high concentration), the liquid E in Example 2 (dispersion of silicon-oxide-coated fine titanium nitride particles), acetone, ethanol (EA), propylene glycol monomethyl ether (PGM), diacetone alcohol (DAA) and formamide (FA) were added to obtain a transparent conductive layer forming coating liquid according to Comparative Example 6 (Ag: 0.052%; Au: 0.208%; TiN: 0.13%; water: 10%; acetone: 40%; EA: 29.58%; PGM: 15%; DAA: 5%; FA: 0.03%), containing noble-metal-coated fine silver particles having individual fine particles not standing agglomerate and the fine titanium nitride particles, and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles and the fine titanium nitride particles and a transparent coat layer formed of a silicate film composed chiefly of silicon oxide, i.e., a transparent conductive layered structure according to Comparative Example 6.

Film characteristics (surface resistance, visible light ray transmittance and haze value) of the transparent double-layer film formed on the glass substrate are shown in Table 3 below.

COMPARATIVE EXAMPLE 7

To the liquid F in Example 3 (dispersion containing the noble-metal-coated fine silver particles standing monodisperse in a high concentration), the liquid E in Example 2 (dispersion of silicon-oxide-coated fine titanium nitride particles), acetone, ethanol (EA), propylene glycol monomethyl ether (PGM), diacetone alcohol (DAA) and formamide (FA) were added to obtain a transparent conductive layer forming coating liquid according to Comparative Example 7 (Ag: 0.04%; Au: 0.16%; TiN: 0.14%; water: 10%; acetone: 40%; EA: 29.63%; PGM: 15%; DAA: 5%; FA: 0.03%), containing noble-metal-coated fine silver particles having individual fine particles not standing agglomerate and the fine titanium nitride particles, and prepared in a concentration enabling the coating liquid to be directly used to form the transparent conductive layer.

Then, the subsequent procedure in Example 3 was repeated but using this transparent conductive layer forming coating liquid, to obtain a glass substrate provided with a transparent double-layer film constituted of a transparent conductive layer containing the noble-metal-coated fine silver particles and the fine titanium nitride particles and a transparent coat layer formed of a silicate film composed chiefly of silicon oxide, i.e., a transparent conductive layered structure according to Comparative Example 7.

Film characteristics (surface resistance, visible light ray transmittance and haze value) of the transparent double-layer film formed on the glass substrate are shown in Table 3 below.

COMPARATIVE EXAMPLE 8

In Example 12, in place of the liquid H in Example 5 (noble-metal type fine-particle dispersion in which the chainlike agglomerates of noble-metal-coated fine silver particles stood disperse in a high concentration), the liquid F in Example 3 (dispersion containing the noble-metal-coated fine silver particles standing monodisperse in a high concentration) was used to obtain a transparent conductive layer forming coating liquid according to Comparative Example 8 (Ag: 0.06%; Au: 0.24%; Phthalocyanine Blue: 0.04%; Quinacridone: 0.1%; water: 6.5%; EA: 63.0%; PGM: 20%; DAA: 10%; FA: 0.05%), containing noble-metal-coated fine silver particles having individual fine particles not standing agglomerate, the fine Phthalocyanine Blue particles and the fine Quinacridone particles, and prepared in a concentration enabling the coating liquid to be directly used to form the transparent conductive layer.

Then, the subsequent procedure in Example 12 was repeated but using this transparent conductive layer forming coating liquid, to obtain a glass substrate provided with a transparent double-layer film constituted of a transparent conductive layer containing the noble-metal-coated fine silver particles, the fine Phthalocyanine Blue particles and the fine Quinacridone particles and a transparent coat layer formed of a silicate film composed chiefly of silicon oxide, i.e., a transparent conductive layered structure according to Comparative Example 8.

Film characteristics (surface resistance, visible light ray transmittance and haze value) of the transparent double-layer film formed on the glass substrate are shown in Table 3 below.

Table 2

Table 3

Evaluation:

1. The following is ascertained from the results shown in Table 2.

First, as shown in the transparent double-layer films according to Comparative Example 3 and Examples 3 and 5, in the case when the noble-metal-coated fine silver particles in the transparent conductive layer forming coating liquid are in a relatively high content (0.4%), the transparent double-layer films according to Examples 3 and 5 have surface resistance of 250 Ω/square and 190 Ω/square, respectively, in respect to the surface resistance (280 Ω/square) of the transparent double-layer film according to Comparative Example 3. The former clearly has a lower surface resistance than the latter, though not so remarkable, and is seen to have been improved in conductivity.

As also shown in the transparent double-layer films according to Comparative Example 4 and Examples 4 and 6, in the case when the noble-metal-coated fine silver particles in the transparent conductive layer forming coating liquid are in a content made smaller (0.2%), the transparent double-layer films according to Comparative Example 4 has surface resistance of $10^6$ Ω/square or more, whereas the transparent double-layer films according to Examples 4 and 6 have surface resistance of 4,000 Ω/square and 1,000 Ω/square, respectively, and are seen to have been improved very much.

As also ascertained from the comparison between Example 3 (67 ppm) and Example 5 (100 ppm) and between Example 4 (67 ppm) and Example 6 (100 ppm), it is also seen that the surface resistance can be adjusted by changing the quantity of the hydrazine to be added at the time of agglomerating treatment.

These results also show that, in respect of the content of the noble-metal-coated fine silver particles in coating liquid that is required to attain practical film resistance value (several kΩ/square or less), it can be made vastly low by making the noble-metal-coated fine silver particles stand agglomerate in the form of chains to make up the chainlike agglomerates, making it possible to provide inexpensive transparent conductive layer forming coating liquids.

2. Then, the following is ascertained from the results shown in Table 3.

That is, in respect to the surface resistance of the transparent double-layer films according to Comparative Examples 5 to 8, the transparent double-layer films according to Examples 7 to 12 are seen to have attained the practical film resistance value even though the noble-metal-coated fine silver particles in the coating liquid are in a small content and also the color pigment is in a large content.

TABLE 1

| Noble-metal-coated fine silver particles | | Hydrazine (ppm) | Fine color= pigment particles (%) | Surface resistance (Ω/square) | Visible= light trans- mittance (%) | Haze value (%) | Bottom reflectance/ bottom wavelength (%)/(nm) |
|---|---|---|---|---|---|---|---|
| Content (%) | Chainlike agglomerates | | | | | | |
| Example: | | | | | | | |
| 1 | 0.15 | formed | 100 | none | 965 | 90.7 | 0.1 | 1.15/565 |
| 2 | 0.20 | formed | 100 | 0.15 (TiN) | 870 | 65.3 | 0.8 | 0.87/560 |
| Comparative Example: | | | | | | | |
| 1 | 0.15 | none | — | none | >10$^6$ | 90.2 | 0.1 | 1.18/570 |
| 2 | 0.20 | none | — | 0.15 (TiN) | >10$^6$ | 65.1 | 0.8 | 0.86/565 |

TABLE 2

| Noble-metal-coated fine silver particles | | Hydrazine (ppm) | Surface resistance (Ω/square) | Visible= light trans- mittance (%) | Haze value (%) |
|---|---|---|---|---|---|
| Content (%) | Chainlike agglomerates | | | | |
| Example: | | | | | |
| 3 | 0.4 | formed | 67 | 250 | 82.0 | 0.2 |
| 4 | 0.2 | formed | 67 | 4,000 | 85.1 | 0.2 |
| 5 | 0.4 | formed | 100 | 190 | 82.3 | 0.3 |
| 6 | 0.2 | formed | 100 | 1,000 | 87.9 | 0.2 |
| Comparative Example: | | | | | |
| 3 | 0.4 | none | — | 280 | 81.5 | 0.1 |
| 4 | 0.2 | none | — | >1 × 10$^6$ | 84.8 | 0.1 |

TABLE 3

| Noble-metal-coated fine silver particles | | Hydrazine (ppm) | Fine color= pigment particles (%) | Surface resistance (Ω/square) | Visible= light trans- mittance (%) | Haze value (%) |
|---|---|---|---|---|---|---|
| Content (%) | Chainlike agglomerates | | | | | |
| Example: | | | | | | |
| 7 | 0.36 | formed | 67 | 0.09 (TiN) | 430 | 67.3 | 0.6 |
| 8 | 0.26 | formed | 67 | 0.13 (TiN) | 1,800 | 64.1 | 0.7 |
| 9 | 0.36 | formed | 100 | 0.09 (TiN) | 270 | 67.4 | 0.6 |
| 10 | 0.26 | formed | 100 | 0.13 (TiN) | 470 | 65.4 | 0.9 |
| 11 | 0.2 | formed | 100 | 0.14 (TiN) | 920 | 66.6 | 1.0 |
| 12 | 0.3 | formed | 100 | 0.04 (*1) 0.1 (*2) | 2,100 | 73.9 | 1.2 |
| Comparative Example: | | | | | | |
| 5 | 0.36 | none | — | 0.09 (TiN) | 1,000 | 64.6 | 0.7 |
| 6 | 0.26 | none | — | 0.13 (TiN) | 6,000 | 63.8 | 0.7 |
| 7 | 0.2 | none | — | 0.14 (TiN) | >1 × 10$^6$ | 65.2 | 0.8 |
| 8 | 0.3 | none | — | 0.04 (*1) 0.1 (*2) | >1 × 10$^6$ | 73.8 | 1.2 |

*1 Phthalocyanine Blue
*2 Quinacridone

What is claimed is:

1. A process for producing a noble-metal type fine-particle dispersion which contains a solvent and noble-metal type fine particles having an average particle diameter of from 1 nm to 100 nm and dispersed in the solvent, said noble-metal type fine particles being any of fine particles of a noble metal selected from gold, silver, platinum, palladium, rhodium and ruthenium; blended fine particles made up of a blend of two or more kinds of fine noble-metal particles; fine alloy particles containing two or more kinds of noble metals; and noble-metal-coated fine silver particles, surface-coated with any of the noble metals except silver, in which a plurality of primary particles of the noble-metal type fine particles stand agglomerated in the form of chains to make up chainlike agglomerates, wherein;

the process comprising the steps of:

an agglomeration step of adding a hydrazine solution to a dispersion in which primary particles of noble-metal type fine particles have been made to stand monodisperse in the solvent, to destabilize the dispersibility of the noble-metal type fine particles in the dispersion by the action of the hydrazine and cause the plurality of primary particles in the noble-metal type fine particles to agglomerate in the form of chains to obtain a dispersion of chainlike agglomerates;

and a stabilization step of adding a hydrogen peroxide solution to the dispersion of the chainlike agglomerates obtained, to decompose and remove the hydrazine to stabilize the dispersibility of the chainlike agglomerates in the dispersion.

2. The process for producing a noble-metal type fine-particle dispersion according to claim 1, wherein said noble-metal-coated fine silver particles are fine silver particles surface-coated with gold or platinum alone or a composite of gold and platinum.

* * * * *